Patented May 9, 1933

1,908,159

UNITED STATES PATENT OFFICE

WILLIAM HENRY MOSS AND BLANCHE B. WHITE, OF CUMBERLAND, MARYLAND, ASSIGNORS TO CELANESE CORPORATION OF AMERICA, A CORPORATION OF DELAWARE

PROCESS FOR PRODUCING TOLUENE SULPHONAMID-ALDEHYDE RESINS

No Drawing.   Application filed August 16, 1928.   Serial No. 300,154.

This invention relates to the preparation of a synthetic resin from toluene sulphonamid, and also to coating or plastic compositions containing derivatives of cellulose, and particularly organic derivatives of cellulose.

An object of our invention is to prepare a synthetic resin that is compatible with derivatives of cellulose, and therefore suitable for use in the films, lacquers or other coating compositions or plastics containing such derivatives of cellulose.

A further object of our invention is to prepare a toluene sulphonamid resin, which is harder than toluene sulphonamid resins previously made, and which is free from defects occurring in such prior resins.

Other objects of our invention will appear in the following detailed description:

While a resin has been previously prepared by the condensation of para-toluene sulphonamid and formaldehyde, this resin is very soft. Therefore, when it is used in coating or plastic compositions containing cellulose esters, it acts more as a plastifier to produce soft films or articles than as a resin, since it does not impart gloss, adhesion or hardness to a film containing the same as is required of a resin when used in lacquer.

Furthermore, the soft resins previously prepared contain a large amount of unconverted toluene sulphonamid, and solutions of these resins, decompose spontaneously to produce more free toluene sulphonamid.

This free toluene sulphonamid is an undesirable component in films, yarns or plastics containing derivatives of cellulose, as it tends to separate out, as is indicated by the fact that films or plastics containing esters of cellulose and the toluene sulphonamid resin in amounts of say—50% to 200% of the weight of the cellulose ester, show a tendency to "bloom" in sunlight, which "bloom" is due to a fine crystalline appearance on the surface of the film or plastic, because of the separation of the toluene sulphonamid.

A further objection to the presence of the free toluene sulphonamid is due to the fact that a water solution thereof has an acid reaction. The decomposition of the prior toluene sulphonamid resin is shown by the fact that a solution of the resin in benzene, which solution has been previously filtered to remove insoluble matter, deposits on standing, a large quantity of free toluene sulphonamid, which is only slightly soluble in benzene.

We have found that if toluene sulphonamid is condensed with equimolecular proportions of formaldehyde or other aldehyde or other compound having a reactive methylene group in the presence or absence of urea, and the resulting resin is heated first to remove the water present and then under reflux, a hard toluene sulphonamid resin is produced, which is soluble in many solvents, is compatible with derivatives of cellulose such as cellulose acetate, is free of and does not decompose to form toluene sulphonamid, and which may be used in sufficiently large quantities to impart gloss, hardness and adhesion to lacquer films, containing derivatives of cellulose.

The resin formed in accordance with our invention, may be employed in making solutions, coating or plastic compositions containing derivatives of cellulose and a suitable solvent.

These solutions or compositions may contain suitable low, medium and/or high boiling solvents, plasticizers or softening agents, other resins, both natural or synthetic and pigments or dyes.

The solutions thus formed, may be employed as lacquer or coating compositions for metallic, glass or other surfaces and may be used for making photographic or other films.

Artificial yarns may be formed by extruding the solution through the orifices of a spinnerette, either into a heated evaporative atmosphere as in dry spinning, or into a precipitating bath, as in wet spinning. The solution may also be employed as an adhesive, and is particularly useful in this connection for making shatterless glass by causing celluloid sheets to adhere to surfaces of sheets of glass between which they are placed.

The plastic containing our resin, may be worked into sheets, which may also be used for laminated glass, and also may be worked into blocks or articles in any known manner.

The derivatives of cellulose that may be used for making solutions coating or plastic compositions, comprise any suitable derivative, such as cellulose nitrate or organic derivatives of cellulose. Examples of organic derivatives of cellulose, are organic esters of cellulose, such as cellulose acetate, cellulose formate, cellulose propionate or cellulose butyrate and cellulose ethers such as ethyl cellulose, methyl cellulose, or benzyl cellulose.

The low boiling solvent that may be employed may be one or a mixture of two or more of the following: acetone, alcohol, benzene or ethylene dichloride. Examples of medium and/or high boiling solvents, are ethyl acetate, ethyl lactate, tetrachlorethane, benzyl alcohol or diacetone alcohol. Examples of suitable plasticizers are diphenylol propane, monomethyl xylene sulphonamid, ortho or meta ethyl toluene sulphonamid. If desired, fire retardants may be added, particularly the very effective bromine derivatives of organic compounds, such as brominated tricresyl phosphate.

The pigments or dyes that may be used are any of the ordinary pigments or dyes used in the paint or lacquer industry.

Of the natural gums or resins that may be employed, the following may be mentioned: Manila, accaroides, pontianak, kauri, dammar, rosin and shellac. The semi-synthetic resin, ester gum which is the glycerol ester of rosin, may also be added. Examples of other synthetic resins that may be used in conjunction with our resin, are the fusible and soluble phenol-formaldehyde, diphenylol propane-formaldehyde and phenol-furfural resins, preferably prepared in the presence of acid catalysts.

The following is a detailed description of one mode of preparing our resin: Equi-molecular proportions of para toluene sulphonamid $CH_3.C_6H_4SO_2NH_2$ and formaldehyde, are heated together. The toluene sulphonamid that is employed may be the pure product, having a melting point of 137° C., or it may be a commercial product, having a lower melting point. The formaldehyde may be employed in the form of a 40% aqueous solution, or in the form of one of its polymers, such as paraformaldehyde. While equi-molecular proportions of the reactants are preferred, the proportions used may be varied considerably. The mixture of the reactants is heated under reflux at 150° C. for sixteen to twenty hours and preferably in a jacketed vessel having oil or other heating medium in the jacket. The condensation may be caused to take place in the presence of an acid or alkaline catalyst, but the presence of catalyst is not necessary. The product thus formed, is a soft yellow resin. It may be washed with water to remove any excess of formaldehyde or toluene sulphonamid present, and the water then removed by heating or otherwise.

In order to prepare the harder and improved resin, the product of the reaction at the end of 16 to 20 hours heating as above described, is distilled at ordinary pressure or under vacuum to remove the excess water. It is then heated to 200–260° C. preferably about 245 to 250° C. At this temperature, some loosely combined formaldehyde first splits off from the resin and then recombines on being returned from the reflux condenser. It is particularly necessary that this heating should be done under reflux, since if the heating is done in an open vessel, the resin will char, froth up and be converted to a black semi-crystalline mass in a short time. At this state of the heating, excess para formaldehyde may be added in amounts up to 15 or 20% of one molecular proportion based on the amount of p-toluene sulphonamid originally used. This heating is continued from 15 minutes to three hours or thereabouts. At the end of this time, the resin is distilled at ordinary pressure at 100–150° C. for 15 minutes to 1 hour.

The product thus obtained is a clear, light yellow resin, having a melting point of 35–40° C. It is entirely soluble in acetone, alcohol and in benzene, and the solutions in benzene do not deposit any free toluene sulphonamid. It is completely compatible in all proportions with cellulose acetate and films, plastics, threads, lacquers etc., made from it, show no tendency to "bloom" on the surface.

In another mode of carrying out our invention, an improved non-blooming resin is prepared by adding a small proportion of urea to the original reactants. Para toluene sulphonamid, one molecular proportion, is heated with 5 to 10% of urea, preferably 5% on the weight of the sulphonamid, and with one molecular proportion of formaldehyde. This heating is preferably performed under reflux in a jacketed vessel with oil or other heating media at 160° C. and is continued for from 15 to 20 hours. The product consists of a layer of resin and one of water. The watery layer is decanted or distilled off and the resin is heated at 160° C. without refluxing for 2 to 3 hours. The clear, light brown resin thus formed is soluble in acetone, alcohol and benzene and is suitable for admixture with cellulose acetate and other cellulose derivatives to produce films, plastics, etc., which do not bloom. Owing to the complete compatibility with cellulose acetate, the resin is particularly suited for admixture with it in any of the numerous technical applications of this ester. It may be used in small proportions to give films which have greater tensile strength than films from the cellulose ester alone. Such films are suitable for photography or protective coating on cloth, fabric, wire, leather, etc. It may be added to cellulose esters in the production therefrom of filaments and threads, as in the manufacture of artificial silk. In larger proportions, it is especially useful in cellulose acetate lacquers, plastics and solutions for use as adhesive.

It is to be understood that the foregoing detailed description is given merely by way of illustration, and that many variations may be made therein, without departing from the spirit of our invention.

Having described our invention, what we claim and desire to secure by Letters Patent is:

1. In the method of preparing a synthetic resin, the step of heating toluene sulphonamid and an aldehyde, in the presence of a small proportion of urea.

2. In the method of preparing a synthetic resin, the step of heating toluene sulphonamid and formaldehyde in the presence of a small proportion of urea.

3. Method of preparing a synthetic resin comprising heating toluene sulphonamid and an aldehyde under reflux until condensation takes place, separating the reaction product and heating to remove excess water, heating at a temperature substantially between 200 and 260° C. under reflux, and finally distilling at ordinary pressure at substantially 100 to 150° C.

4. Method of preparing a synthetic resin comprising heating toluene sulphonamid and formaldehyde under reflux until condensation takes place, separating the reaction product and heating to remove excess water, heating at a temperature substantially between 200 and 260° C. under reflux, and finally distilling at ordinary pressure at substantially 100 to 150° C.

In testimony whereof, we have hereunto subscribed our names.

WILLIAM HENRY MOSS.
BLANCHE B. WHITE.